United States Patent [19]

Ryan

[11] 3,770,282

[45] Nov. 6, 1973

[54] CASSETTE CHANGER

[75] Inventor: Allen L. Ryan, Chicago, Ill.

[73] Assignee: Warwick Electronics Inc., Chicago, Ill.

[22] Filed: Aug. 31, 1971

[21] Appl. No.: 176,655

[52] U.S. Cl. .................... 274/4 F

[51] Int. Cl. .................... G11b 27/22

[58] Field of Search .................... 226/50; 274/4 D, 274/4 F, 4 C, 11 D, 11 E, 11 C; 242/201, 202, 208, 209

[56] References Cited

UNITED STATES PATENTS

| | | | |
|---|---|---|---|
| 3,677,555 | 7/1972 | Vail et al. | 274/4 F |
| 3,490,666 | 1/1970 | Takashino | 226/50 |
| 3,317,212 | 5/1967 | Tatter et al. | 274/4 F |
| 3,659,857 | 5/1972 | Marcinkus | 274/4 F |

*Primary Examiner*—Harry N. Haroian
*Assistant Examiner*—David Moore
*Attorney*—Axel A. Hofgren et al.

[57] ABSTRACT

A cassette changer for successively playing a plurality of tape cassettes and playing the tape in each cassette in two directions and having an improved power drive and cycling mechanism for causing index of cassettes and operation of the tape playing elements including a cycle mechanism brought into drive engagement with a continuously rotating drive element for cycling an actuating element movable between two limit positions which reverses the drive connections for the tape in a cassette and which in every other cycle of operation operates a main slide for causing an index operation for bringing a successive tape cassette into playing position.

2 Claims, 4 Drawing Figures

Inventor:
Allen L. Ryan
By Hofgren, Wegner, Allen, Stellman & McCord
Att'ys

CASSETTE CHANGER

RELATED APPLICATION

This application embodies improvements in the cassette changer disclosed in an application of T. W. Vail et al., Ser. No. 777,689, filed Nov. 21, 1968, now U.S. Pat. No. 3,677,555. The subject matter of this prior application is incorporated herein by reference.

BACKGROUND OF THE INVENTION

This invention pertains to a cassette changer for successively playing a plurality of tape cassettes and for playing a tape in a cassette in both forward and reverse directions of travel of the tape.

An early disclosure of a cassette changer appears in Tatter et al. U.S. Pat. No. 3,317,212, owned by the assignee of this application. The patent discloses a cassette changer having two-direction operation on a tape with a pair of capstans and associated pressure rollers, wherein the pressure rollers are operatively positioned under the control of solenoids and the indexing mechanism for cassettes is powered by a motor separate from the motor for operating the components of the tape-playing mechanism. Following this early development, the Vail et al. application referred to above discloses a refined cassette changer for playing tape in a cassette travelling only in a single direction. A single motor is used but an intermittently-operated solenoid powers a main slide and the solenoid must have substantial power for positively moving the main slide and operating linkage of the cassette changer.

The mechanism disclosed in this application relates to operation of certain playing elements of the cassette changer and the indexing mechanism directly from the continuously-rotating drive mechanism of the cassette changer by intermittent engagement with a portion of the drive mechanism. The power for performing the physical movements of parts of the cassette changer is derived from the drive mechanism and the main motor of the cassette changer, without requiring the use of any large expensive solenoid for physically moving linkages of the cassette changer.

SUMMARY

An object of this invention is to provide new and improved mechanism in a cassette changer wherein indexing of cassettes and two-directional operation of tape-playing elements can be effected by a simple mechanism intermittently operated from the main drive mechanism of the cassette changer.

Still another object of the invention is to provide a cassette changer having mechanism for successively playing a plurality of tape cassettes and for playing tape in both directions of travel, namely, forward and reverse, including a pair of oppositely rotating drive capstans and associated pressure rollers wherein an intermittently operable cycle mechanism driven from the main drive mechanism of the cassette changer moves an actuating element operatively connected to the pair of pressure rollers for alternately positioning one of the pressure rollers in operative association with the adjacent drive capstan.

A further object of the invention is to provide a cassette changer, as defined in the preceding paragraph, wherein the cycle mechanism includes a rotatable member having an actuating surface successively engageable with either one of two abutments formed on the actuating element to engage and shift the actuating element during one-half cycle of revolution of the rotating member and wherein the rotating member includes a second actuating surface which in every other operation of the cycle mechanism engages a main slide for causing index of tape cassettes.

A further object of the invention is to provide a cassette changer as defined in the preceding paragraph wherein the cycle mechanism is brought into operation by energization of a solenoid which pivots a lever carrying a power take-off wheel to move the wheel into drive engagement with a drive element of the continuously operating main drive mechanism which causes rotation of said rotatable member carrying the actuating surfaces and with the rotatable member having a cam coacting with said pivoted lever to maintain the aforesaid drive engagement through one-half revolution of the rotatable member to perform one operation of the cycle mechanism.

DESCRIPTION OF THE PREFERRED EMBODIMENT

A tape cassette is now a commercial product and is well-known in the art. The tape cassette has a pair of interior reels rotatably mounted within the casing of the cassette with a length of tape extending along one edge of the cassette and having portions thereof exposed for engagement with transducing heads for playing and recording on the tape and for coaction with tape drive elements. The tape drive elements include a drive capstan which enters into the interior of the cassette to engage behind the tape and a pressure roller which can move toward the tape to engage the tape between the drive capstan and the pressure roller. Additionally, one of the interior reels of the cassette is driven for take up of the tape as fed by the coacting drive capstan and pressure roller and a drag may be applied to the reel which is functioning as a supply reel. This general organization of structure is conventional and is shown in FIG. 5 of Tatter et al. U.S. Pat. No. 3,317,212.

Figure 1:
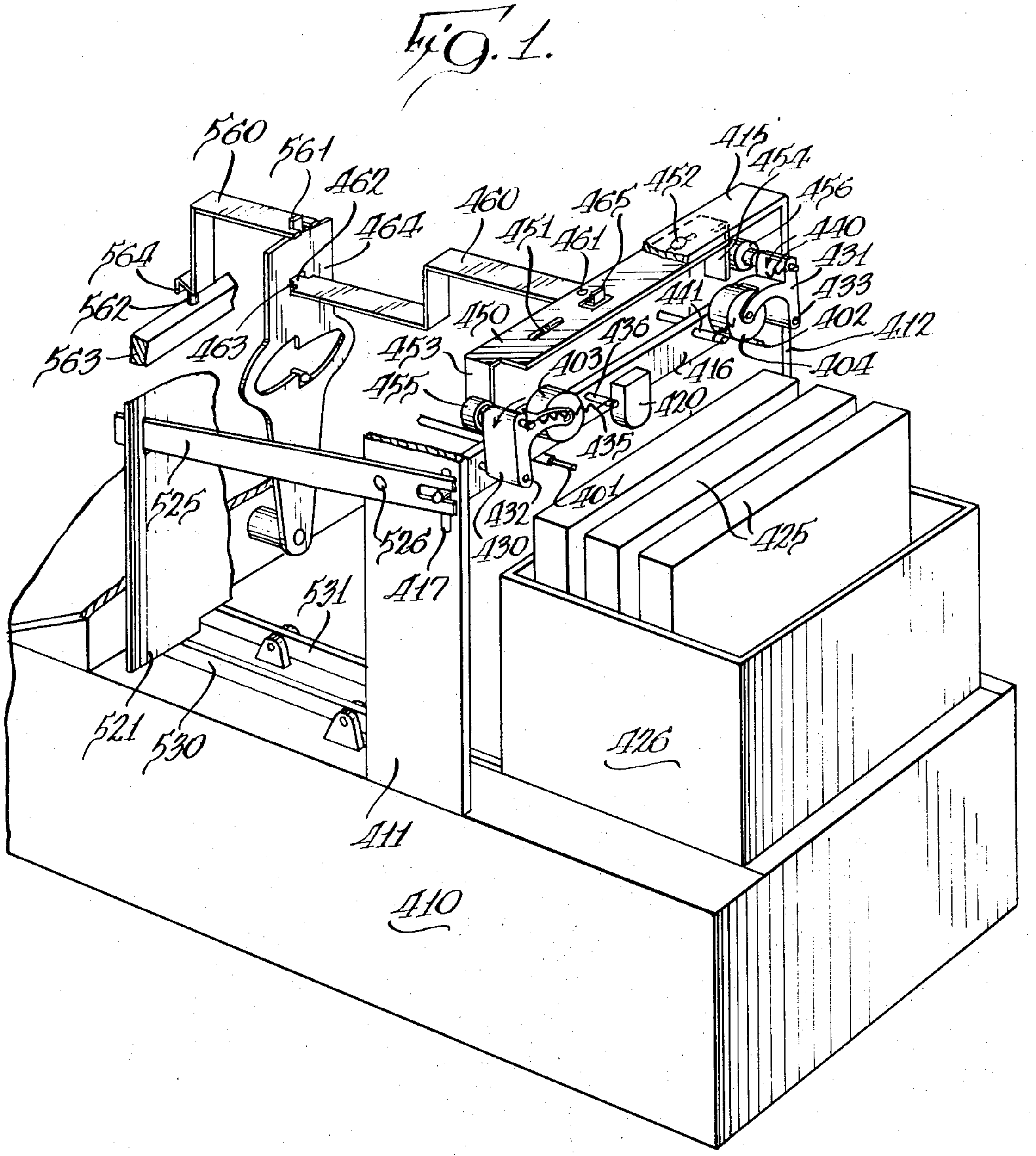
FIG. 1 is a fragmentary perspective view of the cassette changer and showing components operated by the cycle mechanism including the main slide.

A similar structure is shown in this application wherein a pair of tape drive capstans 401 and 402 are continuously driven in opposite directions when the unit is operating and a pair of pressure rollers 403 and 404, respectively, are associated with the capstans. As shown in FIG. 1, pressure roller 404 is in operative position whereby a drive couple is formed with the drive capstan 402 to advance the tape while the drive capstan 401 is inactive. The reel drive shafts are shown at 405 and 406 in FIG. 2 and generally are of the construction shown for spindles 263 and 264 of the Vail et al. patent application.

The cassette changer has a base 410 which mounts a bridge having upstanding side members 411 and 412 with a connecting top plate 415 extending between the side members. The side members 411 and 412 mount a beam 416 for vertical up and down movement by guide elements carried at the ends thereof being movable in slots formed in the side members, such as slot 417 shown in side member 411. This permits vertical movement of the beam 416 between a lowered position wherein a head 420 engages against a tape in a cassette 425 and a raised position wherein the head is remote to permit cassette indexing. The head 420 can be of a known construction having a centrally-positioned play-record section with erase components positioned to either side thereof. The tape cassette 425 is shown as mounted in a removable tray 426 which is mounted and movable in the same manner as shown in the Vail et al application referred to previously.

The pressure rollers 403 and 404 are each carried on a T-shaped arm 430 and 431, respectively, which are pivoted at their lower ends by pins 432 and 433, respectively, to the beam 416 to have an elevated or lowered position as determined by the elevation of the beam. Additionally, each pressure roller pivots relative to the beam and is yieldably urged toward the associated drive capstan by a spring. A spring 435 connected between a pin 436 on the beam and a pin on the T-shaped arm 430 urges the pressure roller 403 in a clockwise direction, as viewed in FIG. 1. A similar spring 440 is connected between a pin 441 on the beam and the T-shaped arm 431 to urge the pressure roller 404 in a counterclockwise direction. The direction of tape travel is determined by which of the pressure rollers 403 and 404 is permitted to pivot toward the associated drive capstan.

Operating means for controlling the positioning of the pressure rollers 403 and 404 includes a plate 450 which is movably mounted to and beneath the top plate 415 of the bridge by a pair of pins 451 and 452 on the top plate 415 which are movably mounted in elongate slots provided in the plate 450. The plate 450 has downturned ends 453 and 454 which coact with a pair of rollers 455 and 456, respectively, extending rearwardly from the T-shaped arms 430 and 431. As shown in FIG. 1, the plate 450 is in its left-hand position, whereby the downturned end 453 has engaged and moved the roller 455 to lift the pressure roller 403 away from the associated drive capstan 401. At the same time, the downturned end 454 has moved away from the roller 456 whereby the spring 440 can urge the pressure roller 404 towards the drive capstan 402.

Said operating means further includes a pivoted link 460 engageable with the plate 450 for causing positioning thereof in either of its two positions. The link 460 is pivoted on the top plate 415 of the bridge by a pin 461 and extends toward the left, as viewed in FIG. 1, to have an end 462 thereof engaged within an opening 463 in an actuating element 464 in the form of a pivoted actuating lever. The opposite end 465 of the link 460 engages in an opening in the plate 450.

The actuating lever 464 is movable between two positions at either side of an upright position whereby the two positions result in sufficient pivoting of the link 460 to position the plate 450 in either of its two control positions. The actuating lever 464 is pivotally mounted on an upright frame plate 470 extending upwardly from the base 410 by mounting on a pin 471 and has an interior opening with a pair of vertically offset and oppositely facing abutments 472 and 473.

Figures 3, 4:
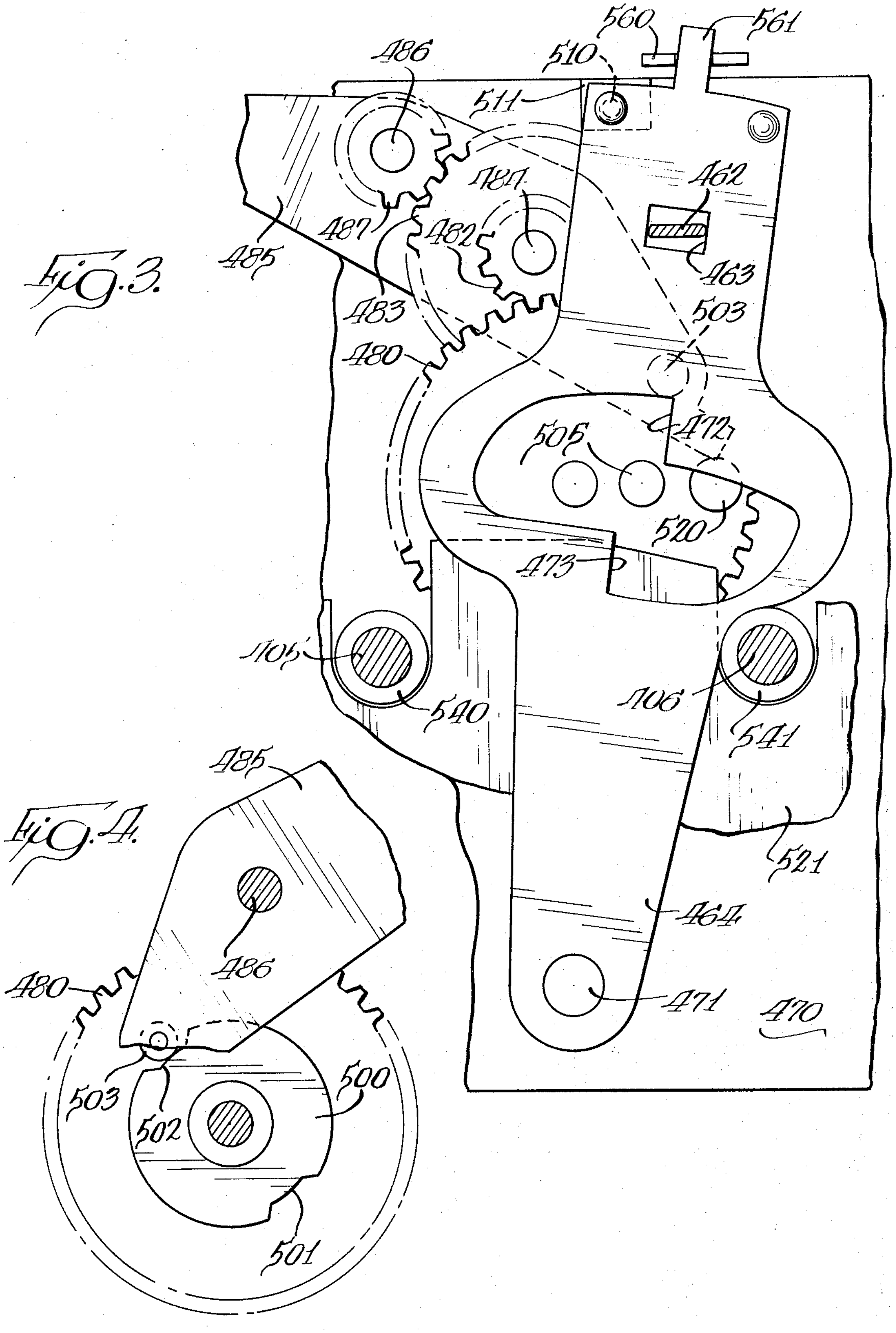
FIG. 3 is a fragmentary elevational view of the actuating lever and main slide and showing the relation of the cycle mechanism therewith.
FIG. 4 is a rear view of a part of the structure shown in FIG. 3.

Cycle mechanism coacts with one or the other of said abutments in each cycle of operation for moving the actuating lever 464 from one extreme position, shown in FIG. 3, across an upright vertical position to the opposite extreme position. This movement is in a counterclockwise direction, as viewed in FIG. 3.

The cycle mechanism includes a rotatable member 480 in the form of a gear rotatably mounted on the plate 470 at 480*a* and having gear teeth 481 which mesh with a gear 482 rotatable with a coaxial larger gear 483. The gears 482 and 483 are rotatably mounted on the frame plate 470 by a mounting pin 484. This mounting pin also rotatably mounts a cycle lever 485 which carries a rotatable shaft 486 having a gear 487 mounted thereon and a power take-off wheel 488. The power take-off wheel is positioned adjacent a reduced diameter serrated section 489 of a flywheel 490 which is adjacent the rear of the capstan shaft 401 and which is part of the continuously operating main drive mechanism. The gear 487 is always in mesh with the gear 483 and rotates on this gear as the cycle lever 485 is pivoted.

Figure 2:
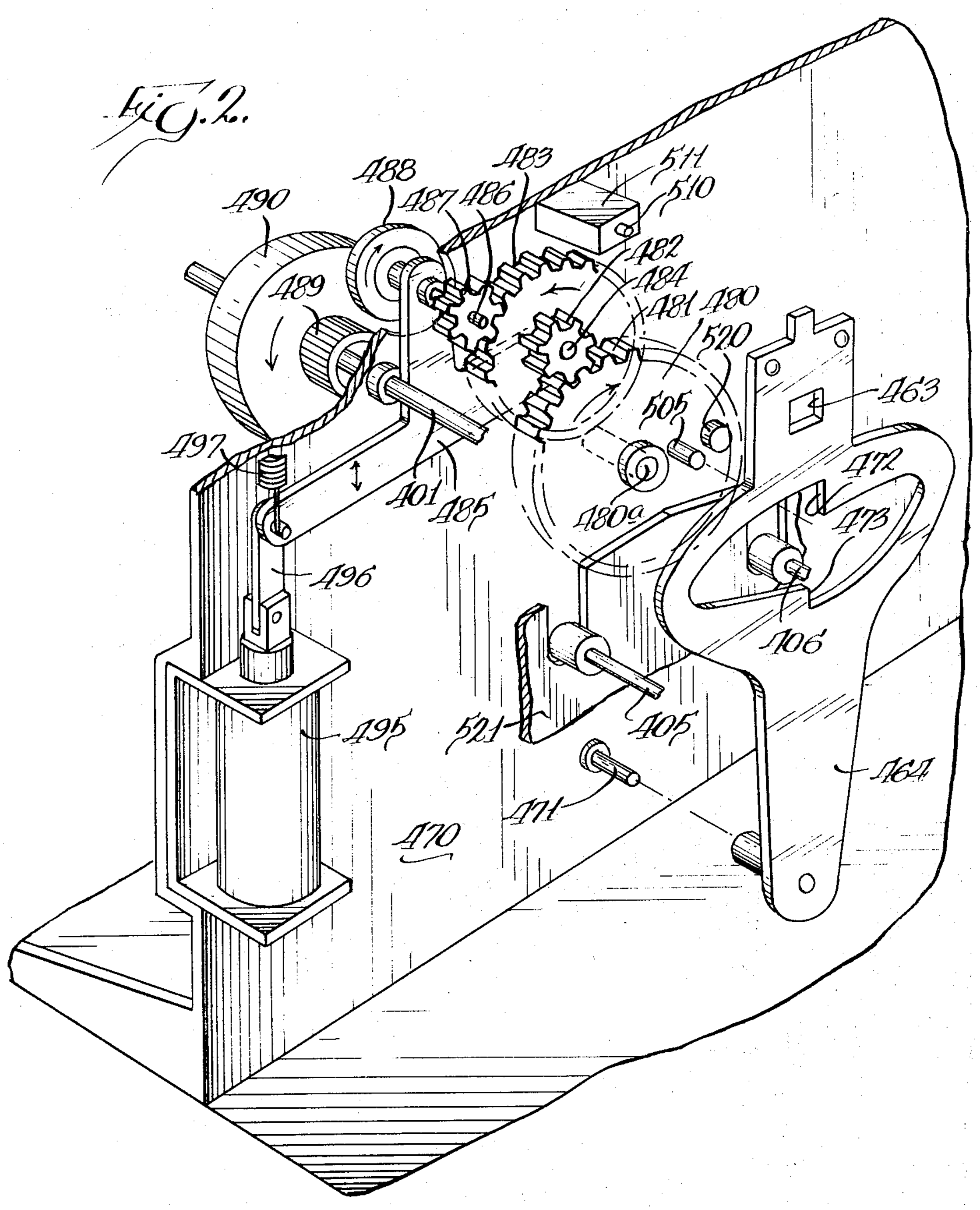
FIG. 2 is a fragmentary exploded perspective view, showing the cycle mechanism and the association thereof with the actuating lever.

With the parts positioned as shown in FIG. 2, the cycle mechanism is inoperative whereby there is no rotation of the rotatable member 480. When the cycle lever 485 is rotated counterclockwise, as shown in FIG. 2, the power take-off wheel 488 is brought into engagement with the Serrated section 489 of the flywheel to complete a drive couple as permitted by the gear 486 rotating on the gear 483 and the resulting drive couple results in rotation of the rotatable member 480. The lowering of the cycle lever 485 is under the control of a solenoid 495 which is momentarily energized to pull on a link 496 connected to the lever 485. Upon deenergization of the solenoid, a spring 497 urges the lever back to the position shown in FIG. 2, but such movement does not occur until the end of a cycle because of cam mechanism associated with the rotatable member 480. This cam mechanism is shown in particular in FIG. 4 wherein a cam 500 on the rotatable member 480 has two opposite recesses 501 and 502 with raised sections therebetween. With the cycle mechanism inactive, a pin 503 on an end of the cycle lever 485 is in the dwell 502 and upon energization of the solenoid 495, pin 503 is lifted and rotation of the rotatable member 480 commences. As soon as the rotatable member starts rotating, the high of the cam engages the pin 503 and maintains the cycle lever 485 in its depressed position. Thus rotation of the rotatable member 480 continues until the pin 503 on the lever is opposite the recess 501 whereby the cycle lever can be moved upwardly by the spring 497 to release the drive engagement with the flywheel 490 and the cycle mechanism stops. The energization of the solenoid 495 can be effected either by sensing the end of tape in the cassette in a known manner or by actuation of a reject button.

The rotatable member 480 of the cycle mechanism has two actuating surfaces, with one of these being an actuating surface 505 defined by a forwardly-projecting element which rotates through a half-revolution in each cycle of the cycle mechanism. This actuating surface coacts successively with the abutments 472 and 473 on the actuating lever 464 with engagement with one abutment in each cycle. With the parts positioned as shown in FIG. 3, rotation of the rotatable member 480 will cause the actuating surface 505 to engage the abutment 473 and pivot the actuating lever 464 about the pivot pin 471 from the inclined position shown to a position inclined upwardly toward the left. The rotation of the rotatable member 480 stops when the actuating element 505 is in a position approximately 180° from that shown in FIG. 3 whereby in the next cycle of operation the actuating element 505 rises and engages the abutment 472 and returns the actuating lever 464 to the position shown in FIG. 3. The arc of travel of the actuating element 505 is such that it moves off and slightly past an abutment prior to completing its rotation, as will be seen in FIG. 3.

The actuating lever 464 is maintained in either of its two positions yieldably by a spring-loaded detent ball 510 mounted in a block 511 extending forwardly from the mounting plate 470 which coacts with the vertical edges of the actuating lever, as shown in FIG. 3.

With every actuation of the cycle mechansim, there will be a shift of the actuating lever 464 with the result that the relation of the pressure rollers 403 and 404 to their respective drive capstans will be reversed. In every other operation of the cycle mechanism, it is an additional requirement that the tray 426 be indexed to bring the next tape cassette in the tray into operative relation with the head 420 and the tape drive elements. This operation is derived from a second actuating surface carried on the rotatable member 480 which is an actuating element 520 extending forwardly from the face of the rotatable member a lesser distance than the actuating element 505. This second actuating surface 520 in the cycle of operation commencing from the position of the parts shown in FIG. 3 rotates in a clockwise direction, as viewed in the latter Figure, to bring the actuating surface down into engagement with a surface on a main slide 521 movably mounted on the mounting plate 470. Lowering movement of the main slide 521 causes mechanism to operate for indexing of the tape cassette tray 426 and also elevation of the beam 416 carrying the head 420 and the pressure rollers 403 and 404. As shown in FIG. 1, the main slide 521 engages a lever 525 pivoted to the side plate 411 of the bridge at 526 whereby lowering of the main slide causes pivoting of the lever with the forward end thereof engaging the beam 416 to cause elevation thereof. This lever mechanism is duplicated at the far side of the cassette changer, but is not shown.

Lowering of the main slide also causes engagement with pivoted levers 530 and 531 which are pivoted on the base 410 and which cause retraction of a tape cassette probe mechanism and a tape cassette tray index mechanism.

The operation of the main slide 521 insofar as operation of the levers 530 and 531 is concerned is analogous to the operation of the main slide 60 in the Vail et al. application, referred to previously, which is operated by the solenoid 400.

The levers 530 and 531 correspond to the levers 74 and 76, particularly shown in FIGS. 11 to 13 of said Vail et al application. These levers operate cassette sensing and index mechanism shown particularly in said Vail et al. application. Such disclosure is incorporated herein by reference and is not shown in detail.

The actuating lever 464 is limited in its movement to extreme positions by engagement with surfaces 540 and 541 shown in FIG. 3 which are concentric with the drive shafts 405 and 406 for the reels in the tape cassette. As shown in FIG. 3, a surface on the actuating lever 464 is in engagement with the surface 541 to limit its pivoting movement and with the lever being held in this position by the spring-loaded ball detent 510.

An additional pivoted lever 560 extends rearwardly from the actuating lever 464 and over the top of the mounting plate 470 and has a slotted forward end engageable with an upwardly extending projection 561 on the actuating lever. The lever 560 is pivoted at 562 to a frame element 563 and has an actuating end 564 engageable with suitable mechanism (not shown) for reversing the drive to the drive shafts 405 and 406 for the tape cassette reels. Such mechanism may include shiftable idler pulleys, but is not disclosed herein as not forming any part of this invention.

The flywheel 490 is continuously driven from the main drive mechanism of the cassette changer when power is supplied to the unit. Energization of the solenoid 495 by a suitable end-of-tape or reject signal derived from normal operation of the cassette changer will initiate operation of the cycle mechanism to shift the actuating lever 464 to reverse the direction of travel of tape in a tape cassette and in every other cycle cause indexing of the tray 426 to bring a successive tape cassette into playing position.

I claim:

1. In a cassette changer for successively playing a plurality of tape cassettes including, a frame, a continuously rotating drive mechanism mount on the frame for driving a pair of tape drive capstans and a pair of coacting pressure rollers alternately urged toward one of said capstans for driving the tape in a cassette in either forward or reverse direction, operating means operatively connected to both of said pressure rollers and movable between two positions wherein in each position one pressure roller engages a tape against the associated capstan and the other pressure roller is inoperative, an actuating lever pivoted on the frame and movable between two positions and operatively connected to said operating means, said actuating lever having a pair of abutment surfaces, a rotatable member rotatably mounted on the frame and having an actuator positioned to engage said abutment surfaces successively upon rotation of the rotatable member through one revolution, and means for operating said rotatable member through successive one-half revolution cycles by power from said continuously rotating drive mechanism including a cycle lever pivoted on the frame, a power take-off drive train for said rotatable member including a power take-off wheel rotatably mounted on said cycle lever and movable toward and away from said continuously rotating drive mechanism, a solenoid connected to said cycle lever for advancing the cycle lever to engage the power take-off wheel with the continuously rotating drive mechanism, spring means opposing said solenoid, and cam means on said rotatable member for holding the cycle lever in said advanced position until the rotatable member completes a one-half revolution cycle.

2. A cassette changer as defined in claim 1 including a main slide operable in a cassette change cycle, a main slide actuator on said rotatable member overlying said main slide and movable into engagement with the main slide in every other one-half revolution cycle of the rotatable member.

* * * * *